United States Patent
Takagi et al.

(10) Patent No.: US 6,313,971 B1
(45) Date of Patent: Nov. 6, 2001

(54) SUSPENSION FOR SUPPORTING MAGNETIC HEAD

(75) Inventors: Yasuji Takagi, Ebina; Nobuo Araki, Hadano; Kenji Endo, Yokohama, all of (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/442,341

(22) Filed: Nov. 17, 1999

(30) Foreign Application Priority Data

Nov. 20, 1998 (JP) .................................................. 10-331171

(51) Int. Cl.[7] ........................................................ G11B 5/60
(52) U.S. Cl. ................................................................ 360/245.2
(58) Field of Search ............................ 360/244.2, 244.3, 360/244.4, 244.5, 244.6, 244.7, 244.8, 244.9, 245.2, 245.4, 245, 245.1

(56) References Cited

U.S. PATENT DOCUMENTS

| | | | |
|---|---|---|---|
| 4,829,395 | * 5/1989 | Coon et al. | 360/244.6 |
| 4,991,045 | * 2/1991 | Oberg | 360/244.3 |
| 5,491,599 | * 2/1996 | Sogabe | 360/265.6 |
| 5,666,241 | * 9/1997 | Summers | 360/245.1 |
| 5,682,279 | * 10/1997 | Imasaki | 360/245 |
| 5,731,931 | * 3/1998 | Goss | 360/244.9 |
| 5,748,409 | * 5/1998 | Girard et al. | 360/245 |
| 6,038,103 | * 3/2000 | Boutaghou et al. | 360/244.6 |
| 6,055,133 | * 4/2000 | Albrecht et al. | 360/245.2 |
| 6,144,531 | * 11/2000 | Sawai | 360/245.1 |
| 6,160,684 | * 12/2000 | Heist et al. | 360/244.5 |
| 6,175,474 | * 1/2001 | Boutaghou et al. | 360/244.6 |
| 6,195,236 | * 2/2001 | Hiraoka et al. | 360/244.5 |
| 6,198,602 | * 3/2001 | Vera et al. | 360/244.5 |
| 6,215,624 | * 4/2001 | Summers et al. | 360/244.5 |

* cited by examiner

Primary Examiner—David L. Ometz
Assistant Examiner—Franklin D. Altman, III
(74) Attorney, Agent, or Firm—Frishauf, Holtz, Goodman, Langer & Chick, P.C.

(57) ABSTRACT

In a suspension provided with a load beam and a flexure, a circular first reference hole is formed in a portion of the flexure nearer to one end thereof than the center, while an oval second reference hole is formed in a portion of the flexure nearer to the other end. The load beam is provided with first and second burred holes corresponding to the first and second reference holes, respectively, in position. Each burred hole has a flange portion on its inner peripheral portion, projecting above the surface of the load beam. The flange portion of the first burred hole is fitted into the first reference hole with the flexure put on top of the load beam in the thickness direction. The flange portion of the second burred hole is fitted into the second reference hole. By doing this, the relative positions of the load beam and the flexure are restricted.

2 Claims, 6 Drawing Sheets

SUSPENSION FOR SUPPORTING MAGNETIC HEAD

BACKGROUND OF THE INVENTION

The present invention relates to a suspension for supporting a magnetic head of a disk unit incorporated in an information processing apparatus, such as a personal computer, and more particularly to an attachment structure for a flexure of the suspension.

Figure 9:
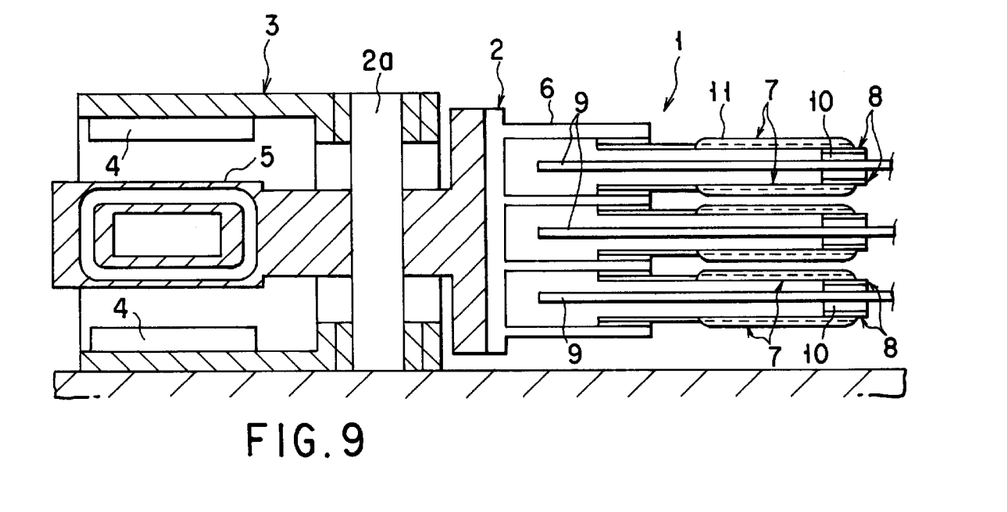
FIG. 9 is a sectional view showing an example of a hard disk drive.

FIG. 9 shows a part of a hard disk drive (HDD) 1. A carriage 2 of the HDD 1 can be turned around a shaft 2a by means of a positioning motor 3 such as a voice coil motor. The carriage 2 is composed of a coil portion 5 located near a magnet 4 of the motor 3, arms (actuator arms) 6 fixed to the coil portion 5, suspensions 7 attached individually to the respective distal end portions of the arms 6, magnetic heads 8 on the respective distal end portions of the suspensions 7, etc. Each head 8 can be moved to a desired track (recording surface) of each of disks 9 by driving the carriage 2 by means of the motor 3.

Each head 8 is provided with a slider 10 in a position such that it can face the track of each disk 9, a transducer (not shown) held on the slider 10, etc. When the disk 9 rotates at high speed, the slider 10 is slightly lifted above the surface of the disk 9, whereby an air bearing is formed between the disk 9 and the slider 10.

Figure 10:
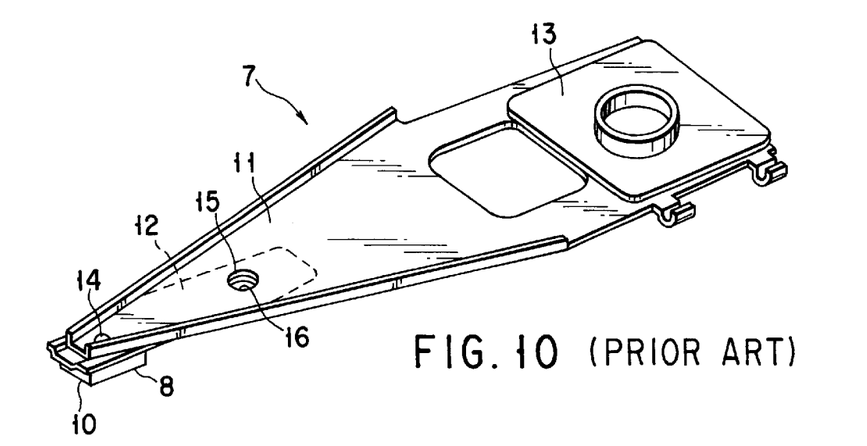
FIG. 10 is a perspective view of a conventional suspension.

FIG. 10 shows an example of the conventional suspension 7. The suspension 7 includes a load beam 11 formed of a thin precision plate spring, a flexure 12 formed of a very thin plate spring fixed to the load beam 11 and a base plate 13 fixed to the proximal portion of the load beam 11, etc. The slider 10 is provided on the distal end portion of the flexure 12. The flexure 12 has rather low stiffness such that the attitude of the lifted slider 10 can flexibly change with respect to the disk 9. The load beam 11 and the flexure 12 are fixed to each other by laser welding or the like in a manner such that they are put in layers in the thickness direction.

A dimple 14 is provided on the distal end portion of the load beam 11. Although the dimple 14 is a hemispherical protuberance that projects toward the slider 10, it is called a dimple in the art because it is recessed on the backside of the load beam 11. As the tip of the dimple 14 abuts on the flexure 12, the head 8 can make three-dimensional displacements, such as pitching and rolling around the dimple 14. In some cases, the dimple 14 may be provided on the flexure 12 in place of the load beam 11.

Figure 11:
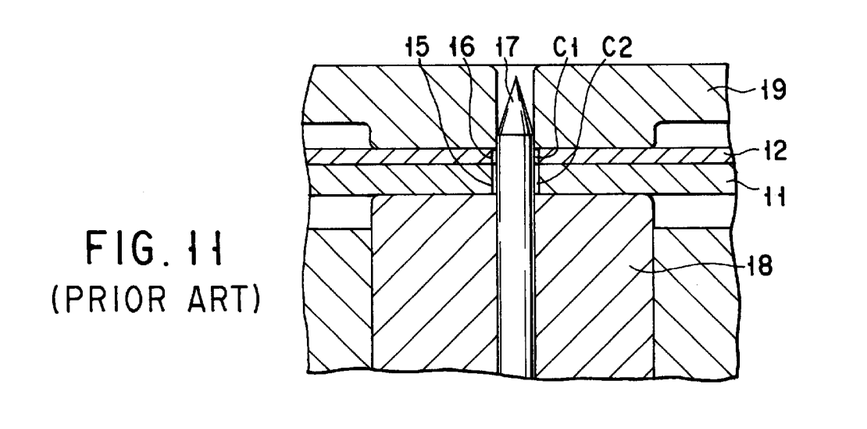
FIG. 11 is a sectional view showing a pad and a presser member for clamping a load beam and a flexure of the conventional suspension.

The load beam 11 and the flexure 12 must be accurately positioned before they are fixed to each other. Conventionally, to attain this, reference holes 15 and 16 are formed in the load beam 11 and the flexure 12, respectively. The laser welding or the like is carried out with a jig pin 17 in the holes 15 and 16 and with the load beam 11 and the flexure 12 clamped in the thickness direction between a pad 18 and a presser member 19 of a clamping device, as shown in FIG. 11.

Figure 12:
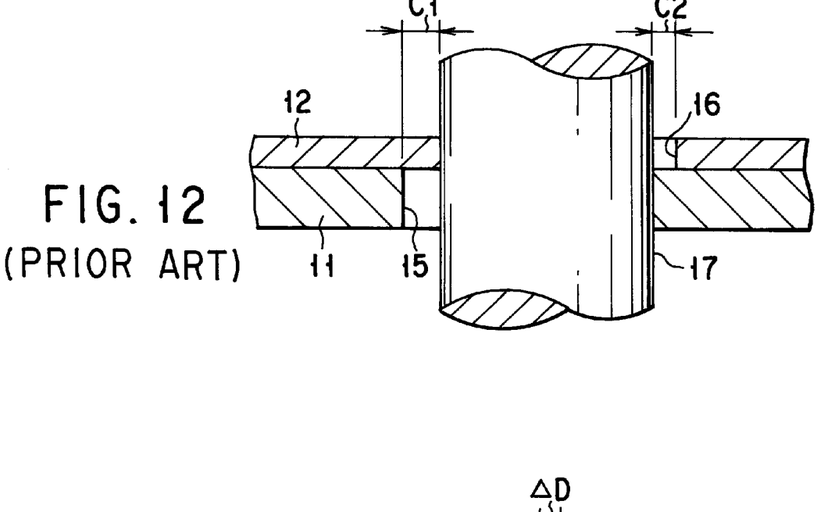
FIG. 12 is a sectional view showing a clearance between a reference hole of the conventional suspension and a jig pin.

In order to prevent the jig pin 17 from damaging the load beam 11 or the flexure 12 as it is inserted into the reference holes 15 and 16, in the prior art example, clearances C1 and C2 are required between the outer peripheral surface of the pin 17 and the inner peripheral surface of the holes 15 and 16. Possibly, however, these clearances C1 and C2 may cause the reference holes 15 and 16 to be correspondingly dislocated in the crosswise direction with respect to the jig pin 17, as shown in FIG. 12. Thus, the load beam 11 and the flexure 12 may be subjected to a maximum center deviation of (C1+C2)/2.

If the load beam 11 and the flexure 12 are dislocated in this manner, moments that act on the slider 10 are unbalanced. It is known that the flying height characteristic of the head 8 for the disk is greatly influenced by the moments that act on the slider 10. In order to obtain a steady flying height characteristic, therefore, moments in the rolling direction, in particular, are expected to be distributed equally.

Figure 13:
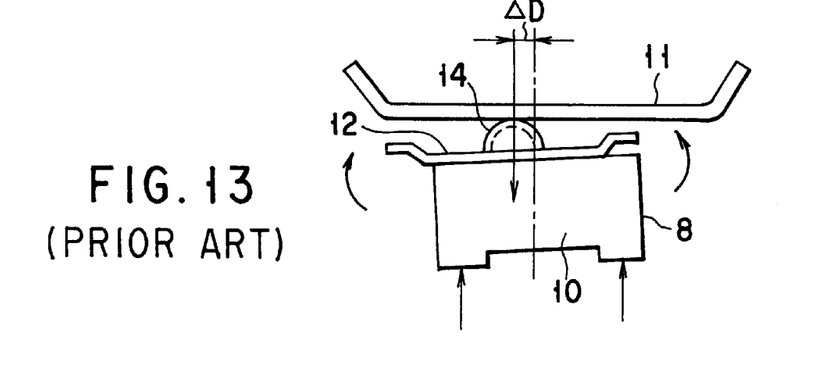
FIG. 13 is a front view of a head portion of the conventional suspension showing dimple dislocation.
Figure 14:
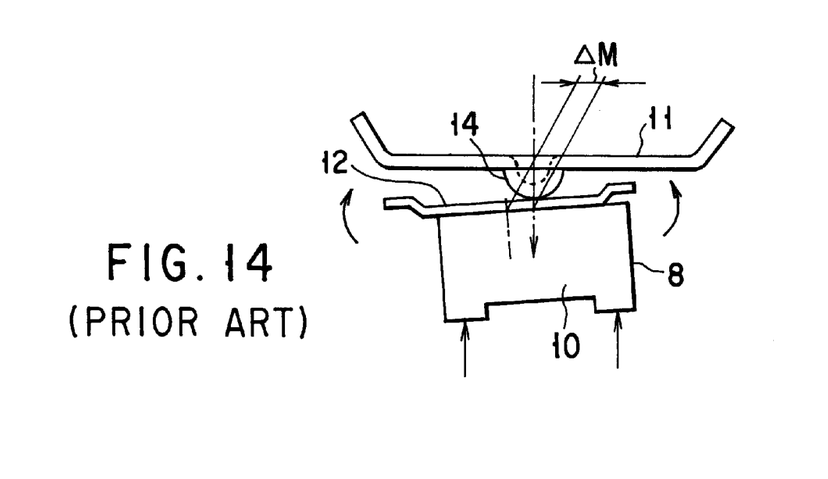
FIG. 14 is a front view of a head portion of another conventional suspension showing moment deviation.

The imbalance of the moments in the rolling direction is attributable to the static rolling angle and dislocation of the dimple 14. In the case where the dimple 14 is provided on the flexure 12, as shown in FIG. 13, the center deviation of the flexure 12 with respect to the load beam 11 is regarded directly as a dimple dislocation ΔD. In the case where the dimple 14 is provided on the load beam 11, as shown in FIG. 14, on the other hand, the center deviation between the load beam 11 and the flexure 12 causes a moment deviation ΔM, and therefore, imbalance of moments attributable to the static rolling angle.

In order to obtain the steady flying height characteristic, therefore, the center deviation between the load beam 11 and the flexure 12 must be minimized. In practice, however, the accuracy of assembly of the load beam 11 and the flexure 12 is subject to variation, so that it is hard to obtain the steady flying height characteristic.

If the relative positions of the load beam 11 and the flexure 12 are deviated, moreover, the following problem will be aroused. To meet the demand for downsizing of heads, wired suspensions have recently been put to practical use. Electrode pads of the wired suspensions are located on the flexure. In consequence, dislocation of the flexure with respect to the load beam causes dislocation of the electrode pads, thus hindering the attachment of magnetic heads.

BRIEF SUMMARY OF THE INVENTION

Accordingly, the object of the present invention is to provide a magnetic head supporting suspension in which the relative positions of a load beam and a flexure can be accurately regulated to solve the aforementioned problems.

In order to achieve the above object, according to the present invention, there is provided a suspension provided with a load beam and a flexure, comprising a reference hole formed in the load beam or the flexure and a burred hole formed in the flexure or the load beam and having a flange portion rising from the inner peripheral edge thereof and capable of being fitted into the reference hole with the flexure on top of the load beam. The load beam and the flexure are formed of a hard metal plate (material for spring) each.

In fixing the load beam and the flexure of the suspension of the invention constructed in this manner, they are positioned with respect to each other by fitting the flange portion of the burred hole into the reference hole. The load beam and the flexure are fixed to each other by adhesive bonding or welding in a manner such that they are restricted in the thickness direction. Since the inside diameter of the reference hole and the outside diameter of the flange portion of the burred hole should only be adjusted to values such that they can engage each other, the clearance between the reference hole and the flange portion can be reduced or approximated to zero.

According to the invention, the load beam and the flexure are positioned by directly fitting the reference hole and the flange portion of the burred hole therein with each other. Thus, the relative positions of the load beam and the flexure can be accurately regulated, so that the two members can enjoy high position accuracy and good assembly symmetry.

Thus, the flying height characteristic of a head and the position accuracy of electrode pads of the wired suspension are improved.

Preferably, a suspension according to the invention comprises a first reference hole formed in the load beam or the flexure, a first burred hole formed in the flexure or the load beam and having a flange portion rising from the inner peripheral edge thereof and capable of being fitted into the first reference hole with the flexure on top of the load beam, a second reference hole formed in the load beam or the flexure and spaced from the first reference hole in the longitudinal direction of the suspension, and a second burred hole formed in the flexure or the load beam and having a flange portion rising from the inner peripheral edge thereof and capable of being fitted into the second reference hole with the flexure on top of the load beam.

According to the invention, the respective flange portions of the burred holes are fitted individually into the two reference holes that are spaced in the longitudinal direction of the suspension, so that the direction of rotation of the flexure relative to the load beam can be restrained from shifting, so that the assembly symmetry of the load beam and the flexure is further improved.

Preferably, according to the invention, the first reference hole is circular, the second reference hole is in the form of an oval elongated in the longitudinal direction of the suspension, and the first and second burred holes are substantially circular. According to this arrangement, variation in the distance between the first and second burred holes is absorbed within the range of the length of the second reference hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the accompanying drawings of FIGS. 1 to 6.

Figure 1:
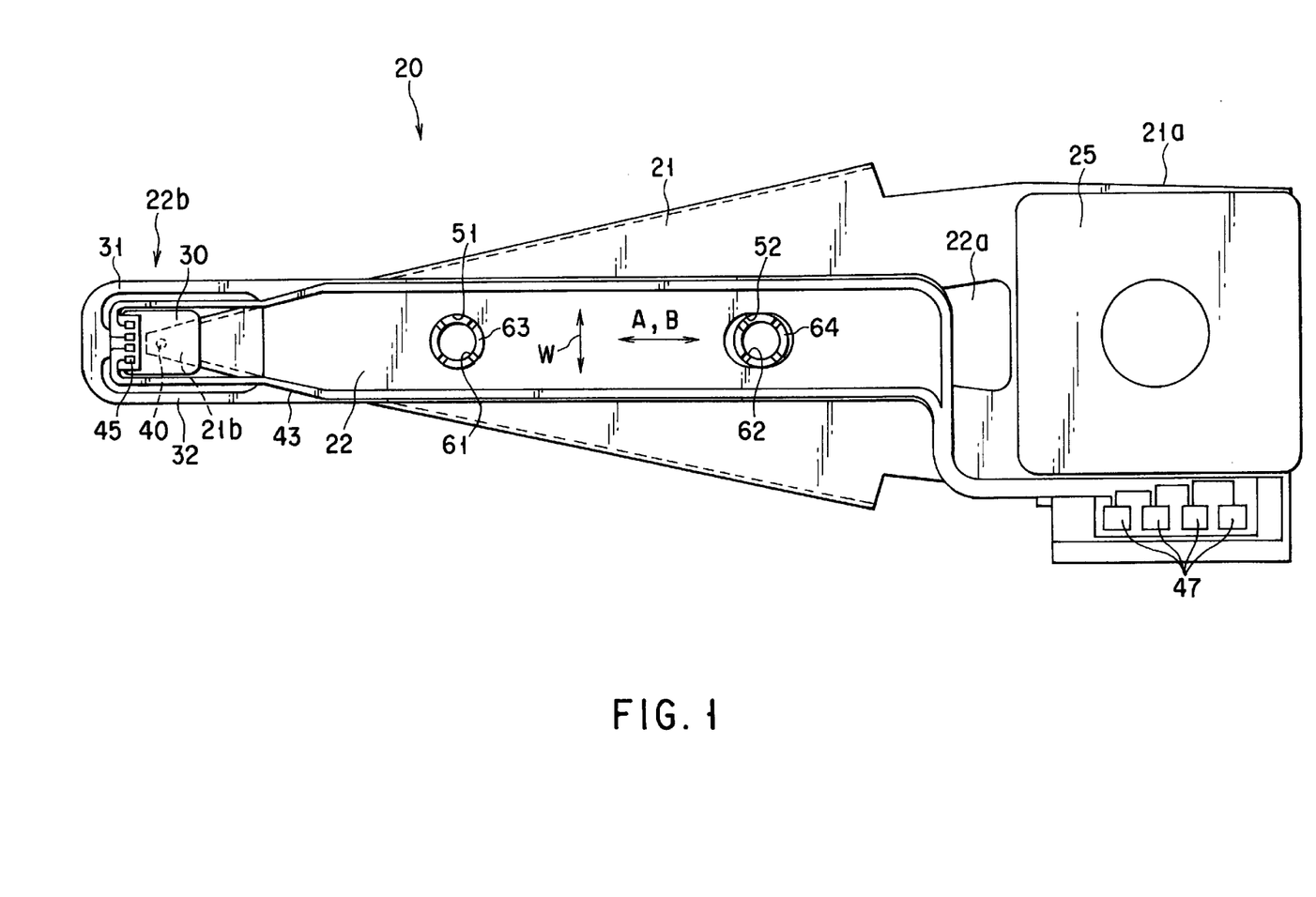
FIG. 1 a plan view of a suspension according to a first embodiment of the present invention.

FIG. 1 shows an example of a wired suspension 20 for a hard disk drive (HDD) unit. The suspension 20 includes a load beam 21, which is formed of a thin precision plate spring of stainless steel or the like, and a flexure 22 formed of a very thin plate spring that is fixed to the beam 21 by laser welding or the like.

The flexure 22 is thinner than the load beam 21. It is formed of a thin springy stainless steel sheet with a thickness of, for example, 18 $\mu$m to 30 $\mu$m. A base plate 25 is located on a proximal portion 21a of the load beam 21. The load beam 21 is fixed to a carriage (e.g., carriage 2 shown in FIG. 9) by means of the base plate 25.

The flexure 22 extends in the axial direction (longitudinal direction) of the load beam 21. A proximal portion 22a of the flexure 22 is situated near the base plate 25. A distal end portion 22b of the flexure 22 is formed having a tongue portion 30, which serves as a movable portion, and outrigger portions 31 and 32 situated on either side of the tongue portion 30. The tongue portion 30 and the outrigger portions 31 and 32 are flexible in the thickness direction of the flexure 22.

Figure 2:
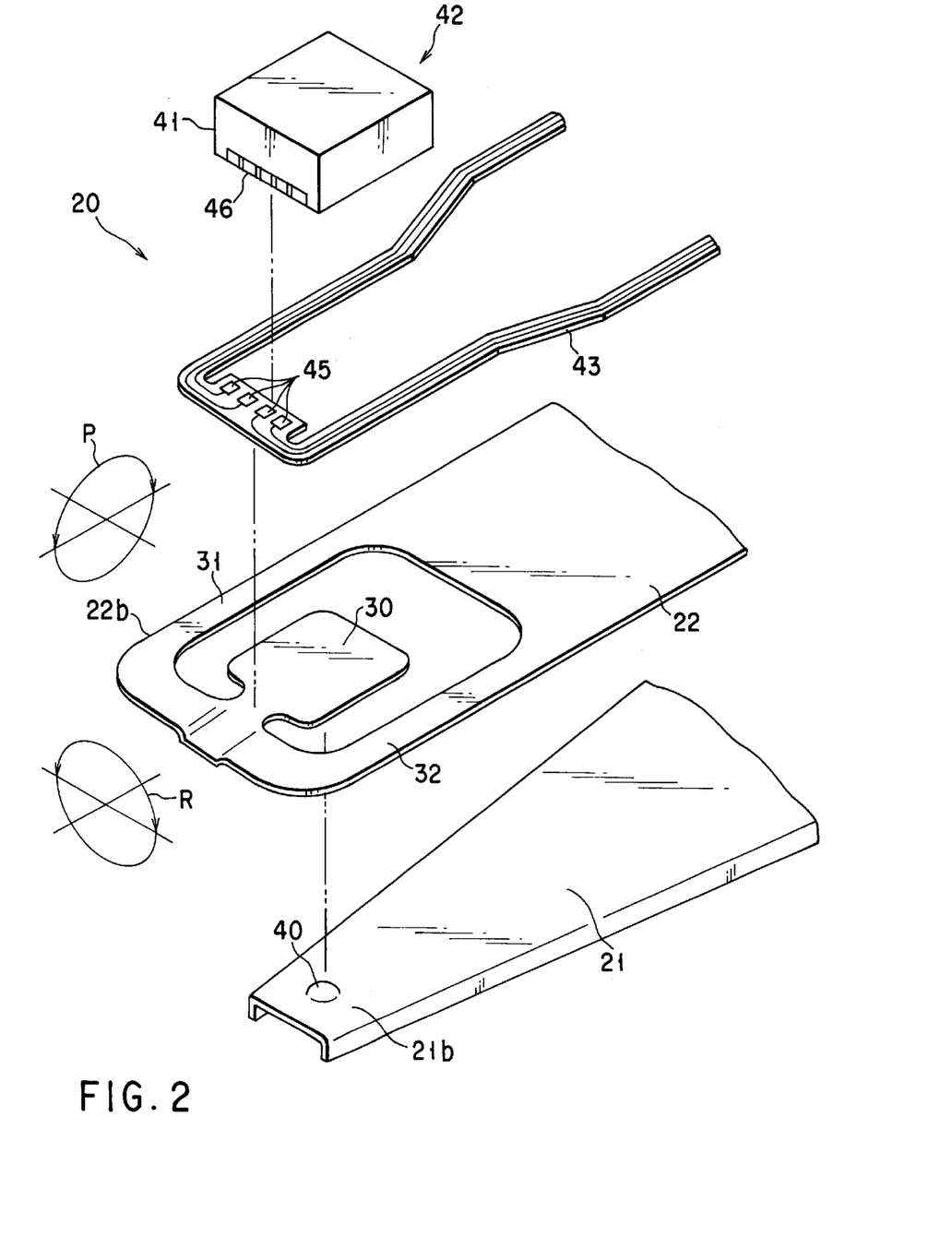
FIG. 2 is an exploded perspective view of a part of the suspension shown in FIG. 1.

The tongue portion 30 can contact with a dimple 40 that is provided on a distal end portion 21b of the load beam 21. Although the dimple 40 is a hemispherical protuberance that projects toward the tongue portion 30, it is called a dimple in the art because it is recessed on the backside of the load beam 21. As shown in FIG. 2, a slider 41 is fixed to the tongue portion 30 by adhesive bonding or the like. The slider 41 is provided with a transducer (not shown) for use as a magnetoelectric element. The transducer, slider 41, etc. constitute a magnetic head 42.

As the tip of the dimple 40 pushes the tongue portion 30, the slider 41 and the tongue portion 30 can make three-dimensional displacements, such as pitching (in the direction of arrow P in FIG. 2) and rolling (in the direction of arrow R in FIG. 2) around the dimple 40. In some cases, the dimple 40 may be provided on the tongue portion 30 in place of the load beam 21.

The flexure 22 is provided with a wiring portion 43. Electrode pads 45 are attached to one end of the wiring portion 43. They are connected electrically to a terminal 46 of a slider 41. As shown in FIG. 1, the other end of the wiring portion 43 extends in the longitudinal direction of the flexure 22, and its terminal portions 47 are located near the base plate 25. The terminal portions 47 are connected to external lead wires (not shown), individually.

Figure 3:
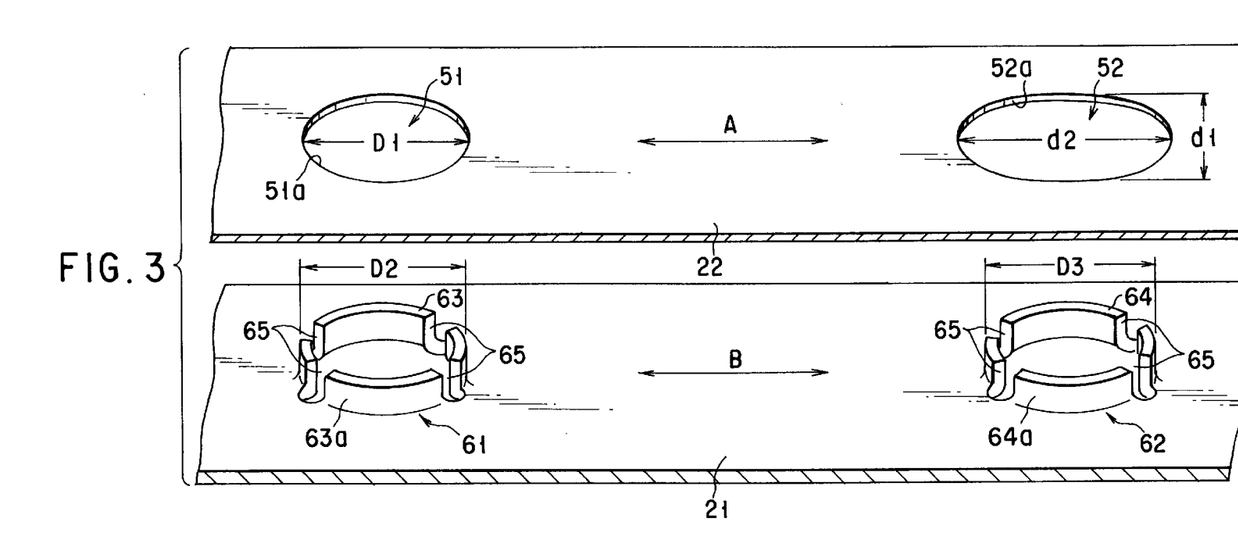
FIG. 3 is a perspective view partially showing a load beam and a flexure of the suspension of FIG. 1.

As shown in FIGS. 1 and 3, a first reference hole 51 is formed in a portion of the flexure 22 nearer to the distal end portion 22b than the center (in a position nearer to one end of the suspension 20). A second reference hole 52 is formed in a portion of the flexure 22 nearer to the proximal portion 22a than the center (in a position nearer to the other end of the suspension 20). These two reference holes 51 and 52 are spaced from each other in the longitudinal direction (direction A) of the flexure 22.

The reference holes 51 and 52 are formed by partially boring the flexure 22 by etching or pressing. The first reference hole 51 is a substantially circular hole, while the second reference hole 52 is an oval hole that is elongated in the longitudinal direction A of the flexure 22. The second reference hole 52 has a minor axis d1 that extends in a crosswise direction W of the flexure 22 and a major axis d2 that extends in the longitudinal direction A of the flexure 22. These reference holes 51 and 52 can be formed by etching with high shape accuracy in accurate positions on the flexure 22.

The load beam 21 is formed having first and second burred holes 61 and 62 that are situated corresponding to the first and second reference holes 51 and 52, respectively. The burred holes 61 and 62 are formed by flanging or burring, a kind of pressing. The burred holes 61 and 62 have flange portions 63 and 64, respectively, which rise individually from the respective inner peripheral edges of circular cutouts. The flange portions 63 and 64 project above the surface of the load beam 21. Although the illustrated flange portions 63 and 64 are formed having slits 65 each, the slits 65 are not essential. The two burred holes 61 and 62 are spaced from each other in the longitudinal direction (direction B) of the load beam 21.

The flange portion 63 of the first burred hole 61 is inserted into the first reference hole 51. An inside diameter D1 of the reference hole 51 is equal to or a little greater than an outside diameter D2 of the flange portion 63 so that an outer peripheral surface 63a of the flange portion 63 can be fitted in an inner peripheral surface 51a of the reference hole 51.

The flange portion 64 of the second burred hole 62 is inserted into the second reference hole 52. The minor axis d1 of the reference hole 52 is equal to or a little greater than an outside diameter D3 of the flange portion 64 so that an outer peripheral surface 64a of the flange portion 64 can be fitted in an inner peripheral surface 52a of the reference hole 52. The major axis d2 of the reference hole 52 is greater than the outside diameter D3 so that the flange portion 64 can move for some distance in the longitudinal direction of the flexure 22 when the flange portion 64 is in the reference hole 52.

Figure 4:
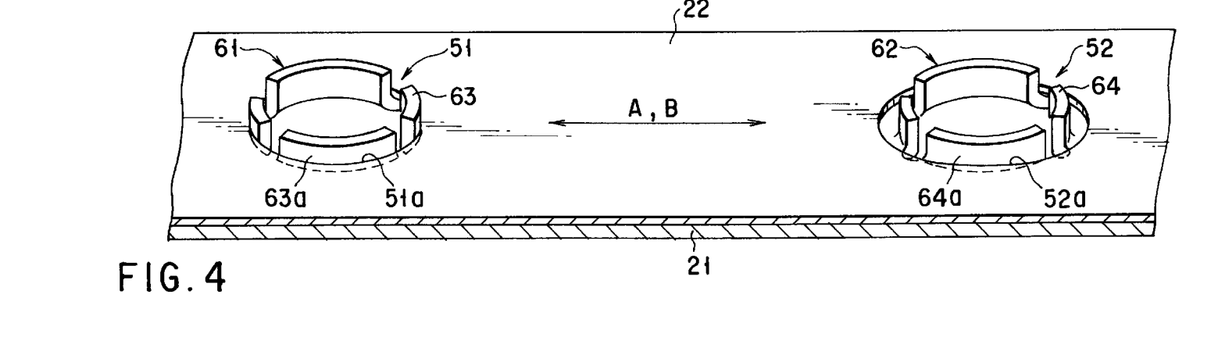
FIG. 4 is a perspective view showing the load beam and the flexure of FIG. 3 in layers.

The load beam 21 and the flexure 22 must be positioned before they are fixed to each other by laser welding or the like. In doing this, the flange portions 63 and 64 are fitted into their corresponding reference holes 51 and 52, as shown in FIG. 4, with the load beam 21 and the flexure 22 put in layers in the thickness direction. The position of the flexure 22 relative to the load beam 21 in the longitudinal direction A is restricted as the first reference hole 51 engages the first burred hole 61. The position of the flexure 22 relative to the load beam 21 in the crosswise direction W is restricted as the reference holes 51 and 52 engage the burred holes 61 and 62, respectively.

Figure 5:
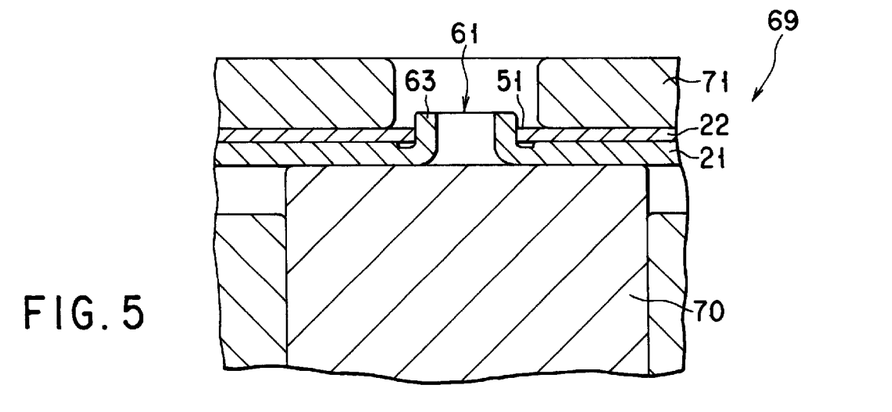
FIG. 5 is a sectional view showing a pad and a presser member for clamping the load beam and the flexure of FIG. 3.
Figure 6:
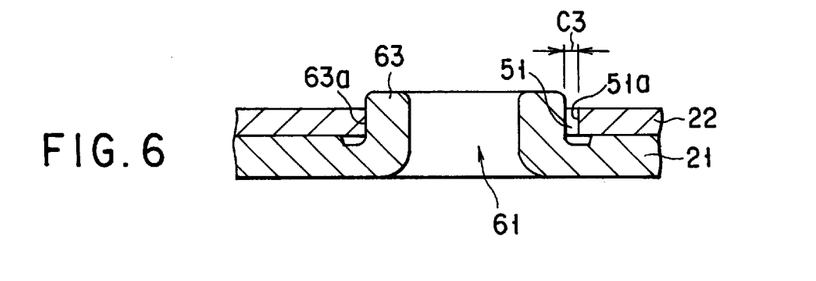
FIG. 6 is a sectional view showing a clearance between a reference hole and a burred hole shown in FIG. 3.

As shown in FIG. 5, moreover, the load beam 21 and the flexure 22 are clamped in the thickness direction between a pad 70 and a presser member 71 of a clamping device 69. In this state, the load beam 21 and the flexure 22 are fixed to each other with an adhesive agent or by laser welding. Even if there is a clearance C3 between the first reference hole 51 and the first flange portion 63, as shown in FIG. 6, the center deviation between the load beam 21 and the flexure 22 is (C3)/2 at the most. Likewise, if there is a clearance between the second reference hole 52 and the second flange portion 64, the center deviation between the beam 21 and the flexure 22 is (C3)/2 at the most.

The value of this center deviation is about half that of the center deviation (C1+C2)/2 of the conventional suspensions shown in FIG. 12 and other drawings. Since the reference holes 51 and 52 and the flange portions 63 and 64 are expected to have dimensions such that they can engage one another, the clearance C3 can be reduced or approximated to zero.

Thus, according to this embodiment, the center deviation between the load beam 21 and the flexure 22 can be made so small that imbalance of moments that act on the slider 41 is reduced. In the suspension 20 that is provided with the dimple 40 on the load beam 21, therefore, imbalance of moments attributable to the static rolling angle is reduced. In the suspension that is provided with the dimple 40 on the tongue portion 30, moreover, dislocation of the dimple is lessened. Accordingly, moments in the rolling direction, in particular, can be distributed more equally than in the conventional case, so that a steady flying height characteristic can be obtained.

Since the relative positions of the load beam 21 and the flexure 22 can be regulated accurately, furthermore, dislocation of the electrode pads 45 on the flexure 22 can be also lessened in the wired suspension that is conducive to downsizing of the head.

Figure 7:
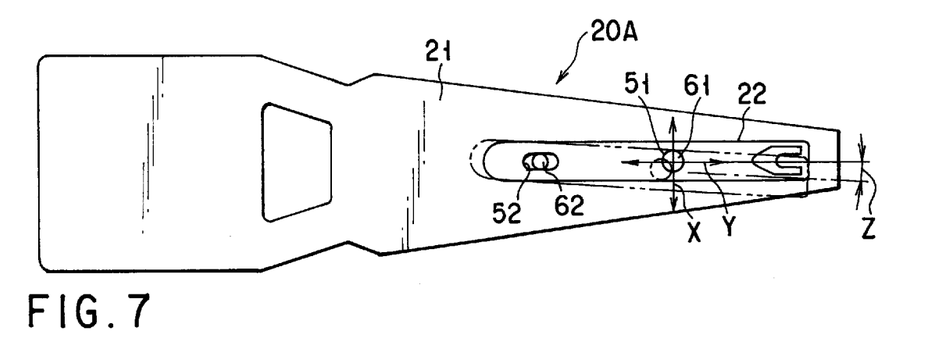
FIG. 7 is a plan view of a suspension according to a second embodiment of the invention.

FIG. 7 shows a suspension 20A according to a second embodiment of the invention. The construction, function, and effect of this suspension 20A are basically the same as those of the suspension 20 according to the first embodiment. These two suspensions are different only in the shape of the flexure 22.

For the suspension 20A according to the second embodiment, dislocations in the X- and Y-directions (crosswise and longitudinal directions of the suspension) and dislocation Z in the rotating direction were measured. Thereupon, any of those dislocations was found to be ±10 μm, which ensures good assembly symmetry of the load beam 21 and the flexure 22.

In the conventional suspension (in which the load beam 11 and the flexure 12 are positioned by means of the jig pin 17, as shown in FIG. 11), the X- and Y-direction dislocations are 20 μm, and the rotating-direction dislocation Z is as large as 25 μm. Thus, the assembly symmetry of the load beam and the flexure is poor.

Figure 8:
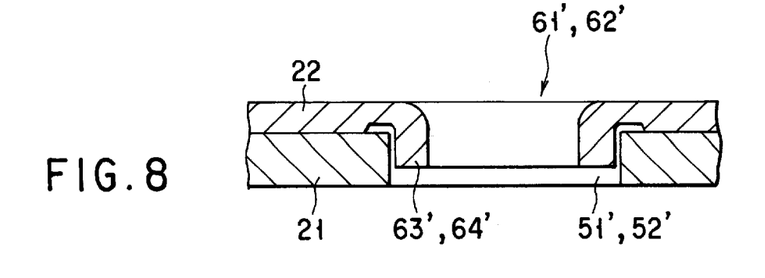
FIG. 8 is a sectional view partially showing a load beam and a flexure of a suspension according to a third embodiment of the invention.

According to the foregoing embodiments, the load beam 21 is provided with the burred holes 61 and 62, while the flexure 22 is formed having the reference holes 51 and 52. As shown in FIG. 8, in contrast with this, the load beam 21 may be provided with reference holes 51' and 52', and the flexure 22 with burred holes 61' and 62'. Flange portions 63' and 64' protrude individually from the respective inner peripheral edges of the burred holes 61' and 62' in the thickness direction of the flexure 22. The flange portions 63' and 64' can be fitted into their corresponding reference holes 51' and 52'.

It is to be understood that various factors including the respective shapes or numbers of elements that constitute the present invention, such as the load beam, flexure, magnetic head, reference holes, burred holes, flange portions, etc., may be suitably modified in carrying out the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic head supporting suspension provided with a load beam formed of a metal plate and a flexure formed of a metal plate thinner than the load beam, fixed to the load beam in overlapping manner, and designed to carry a magnetic head on the distal end portion thereof, comprising:

a first reference hole formed in the load beam or the flexure;

a first blurred hole formed in the flexure or the load beam and having a flange portion rising from the inner peripheral edge thereof and capable of being fitted into the first reference hole with the flexure on top of the load beam;

a second reference hole formed in the load beam or the flexure and spaced from the first reference hole in the longitudinal direction of the suspension; and a second blurred hole formed in the flexure or the load beam and having a flange portion rising from the inner peripheral edge thereof and capable of being fitted into the second reference hole with the flexure on top of the load beam, wherein said first reference hole is circular, said second reference hole is an oval elongated in the longitudinal direction of the suspension, and said first and second blurred holes are substantially circular.

2. A magnetic head supporting suspension provided with a load beam formed of a metal plate and a flexure formed of a metal plate thinner than the load beam, fixed to the load beam in overlapping manner, and designed to carry a magnetic head on the distal end portion thereof, comprising:

a first reference hole formed in the load beam or the flexure;

a first blurred hole formed in the flexure or the load beam and having a flange portion rising from the inner peripheral edge thereof and capable of being fitted into the first reference hole with the flexure on top of the load beam;

a second reference hole formed in the load beam or the flexure and spaced from the first reference hole in the longitudinal direction of the suspension; and a second blurred hole formed in the flexure or the load beam and having a flange portion rising from the inner peripheral edge thereof and capable of being fitted into the second reference hole with the flexure on top of the load beam, wherein said first reference hole is circular, and said second reference hole is an oval elongated in the longitudinal direction of the suspension.

* * * * *